United States Patent
Wang et al.

(10) Patent No.: US 7,581,171 B2
(45) Date of Patent: Aug. 25, 2009

(54) POSITIONALLY ENCODED DOCUMENT IMAGE ANALYSIS AND LABELING

(75) Inventors: Jian Wang, Beijing (CN); Yingnong Dang, Beijing (CN); Liyong Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 10/753,176

(22) Filed: Jan. 6, 2004

(65) Prior Publication Data

US 2005/0149865 A1 Jul. 7, 2005

(51) Int. Cl.
*G06F 17/00* (2006.01)
*G06F 17/20* (2006.01)

(52) U.S. Cl. .......................................... 715/234; 705/50
(58) Field of Classification Search ................. 715/513, 715/512, 234; 705/50
See application file for complete search history.

(56) References Cited

U.S. PATENT DOCUMENTS

| | | | |
|---|---|---|---|
| 5,146,552 A | 9/1992 | Cassorla et al. | |
| 5,455,898 A * | 10/1995 | Mahoney et al. | 715/527 |
| 5,572,010 A * | 11/1996 | Petrie | 235/494 |
| 5,581,682 A | 12/1996 | Anderson et al. | |
| 5,626,620 A | 5/1997 | Kieval et al. | |
| 5,659,639 A * | 8/1997 | Mahoney et al. | 382/309 |
| 5,689,585 A * | 11/1997 | Bloomberg et al. | 382/229 |
| 5,768,426 A * | 6/1998 | Rhoads | 382/232 |
| 5,855,594 A | 1/1999 | Olive et al. | |
| 6,044,301 A | 3/2000 | Hartlaub et al. | |
| 6,208,894 B1 | 3/2001 | Schulman et al. | |
| 6,327,395 B1 * | 12/2001 | Hecht et al. | 382/306 |
| 6,377,704 B1 * | 4/2002 | Cooperman | 382/176 |
| 8,551,357 | 4/2003 | Madduri | |
| 6,570,104 B1 * | 5/2003 | Ericson et al. | 178/18.09 |
| 6,577,748 B2 * | 6/2003 | Chang | 382/100 |
| 6,608,942 B1 * | 8/2003 | Le | 382/279 |
| 7,079,667 B2 * | 7/2006 | Hecht et al. | 382/100 |
| 2001/0037132 A1 | 11/2001 | Whitehurst et al. | |

(Continued)

FOREIGN PATENT DOCUMENTS

WO WO 99/65568 12/1999

OTHER PUBLICATIONS

Reid et al.;"Second-Generation Image Coding: An Overview"; 1997, ACM, pp. 5-8.*

(Continued)

*Primary Examiner*—Laurie Ries
*Assistant Examiner*—James J Debrow
(74) *Attorney, Agent, or Firm*—Lee & Hayes, PLLC

(57) ABSTRACT

Disclosed embodiments of the invention relate to analyzing document images, which contain positionally encoded information, such as a maze-pattern watermark, and labeling the images based on a degree to which the document's content, such as text, occludes the position-encoding information. Depending on the degree of such occlusion, it may not be possible to extract enough position-encoding bits from a camera-captured image of the document to determine the camera-captured image's location within the document. An analysis-and-labeling module receives, as input, image data output by an image-generation-and-capturing module and off-line training data; performs analysis-and-labeling processing; and outputs image-label information. The results of document-analysis-and-labeling processing may be used for efficiently determining a location of a camera-captured image within a positionally encoded document.

39 Claims, 18 Drawing Sheets

U.S. PATENT DOCUMENTS

| | | | |
|---|---|---|---|
| 2002/0076080 A1* | 6/2002 | Hecht et al. | 382/100 |
| 2003/0081000 A1 | 5/2003 | Watanabe et al. | |
| 2003/0117378 A1 | 6/2003 | Carro | |
| 2003/0156733 A1* | 8/2003 | Zeller et al. | 382/100 |
| 2003/0197700 A1* | 10/2003 | Tanaka et al. | 345/419 |
| 2005/0025357 A1* | 2/2005 | Landwehr et al. | 382/170 |
| 2005/0058318 A1* | 3/2005 | Rhoads | 382/100 |
| 2008/0219555 A1* | 9/2008 | Wiedemann et al. | 382/181 |

OTHER PUBLICATIONS

Kankanhalli et al.;"Content Based Watermarking of Images";;1998;ACM;pp. 61-70.*

Zhu et al.,"Information Encoding Into and Decoding From Dot Texture for Active Forms", ACM, 2003, pp. 105-114.*

Vailiancourt et al.,"Generated Glyphs as Memorable Desktop Icons for Documents", ACM, 2000, pp. 9-12.*

Nevison et al.,"Using a Maze Case Study to Teach Object-Oriented Programming and Design Patterns", Australian Computer Society, 2004, pp. 207-215.*

Dillencourt et al.,"A General Approach to Connected-Component Labeling for Arbitary Image Representations", ACM, 1992, pp. 253-280.*

Fang et al.,"A Parallel Processing Approach to Image Object Labeling Problem", ACM, 1987, pp. 423.*

C. Decurtins, M.C. Norrie, and B. Signer, "Digital Annotation of Printed Documents", CIKM '03 Nov. 3-8, 2003, New Orleans, Louisiana, pp. 552-555.

I. Dumer, D. Micciancio and M. Sudan, "Hardness of Approximating the Minimum Distance of a Linear Code", 1999 IEEE, pp. 475-484.

D. Clark and L. Weng, "Maximal and Near-Maximal Shift Register Sequences: Efficient Event Counters and Easy Discrete Logarithms" (pp. 1-23), IEEE Transaction on Computers 43, (May 5, 1994), pp. 560-568.

G. Golovchinsky and L. Denoue, "Moving Markup: Repositioning Freeform Annotations", UIST '02, Oct. 27-30, 2002, Paris, France, vol. 4, Issue 2, pp. 21-24.

A.J. Brush, D. Bargeron, A. Gupta and JJ Cadiz, "Robust Annotation Positioning in Digital Documents", SIGCHI '01, Mar. 31-Apr. 4, 2001, Seattle, Washington, pp. 285-292.

* cited by examiner

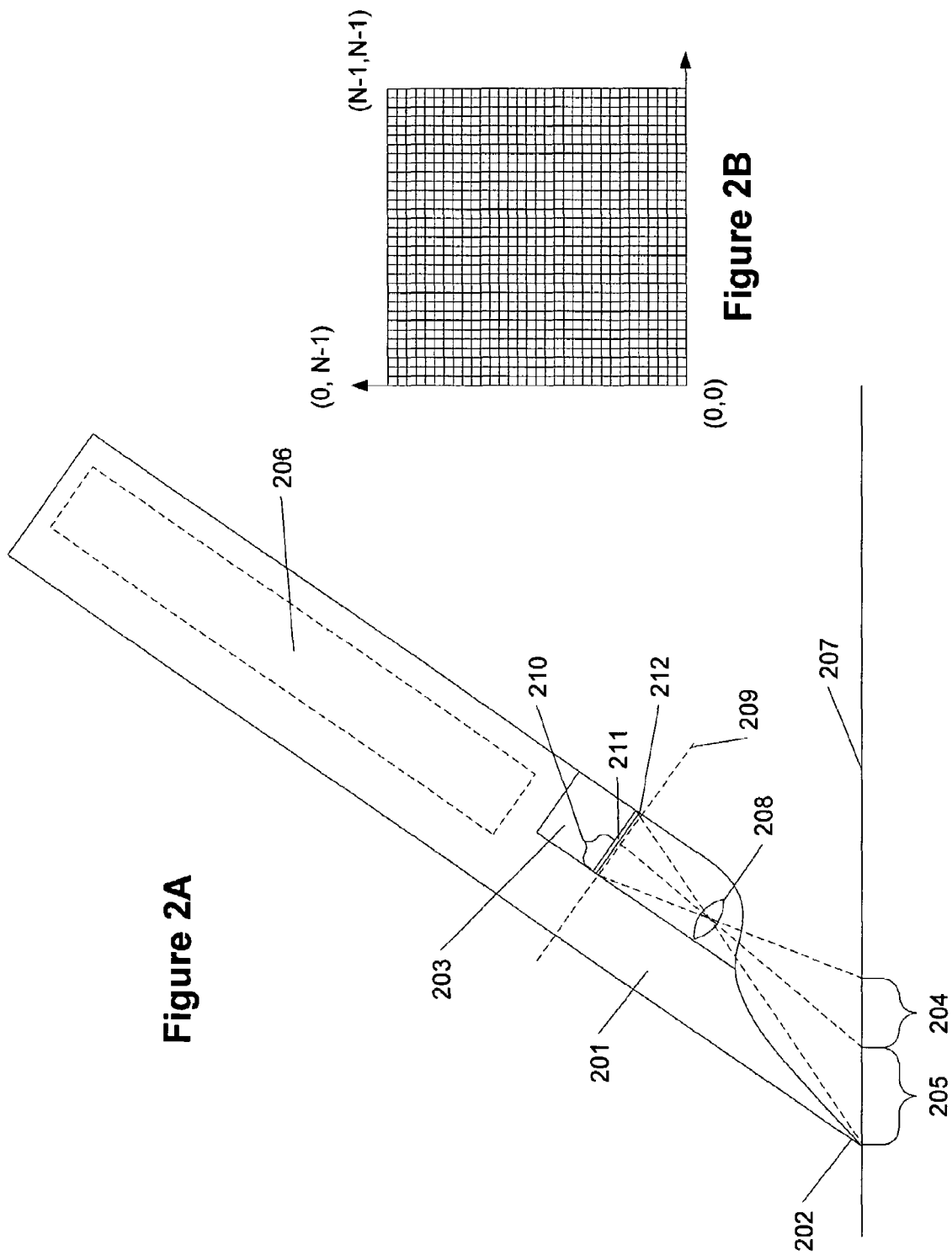

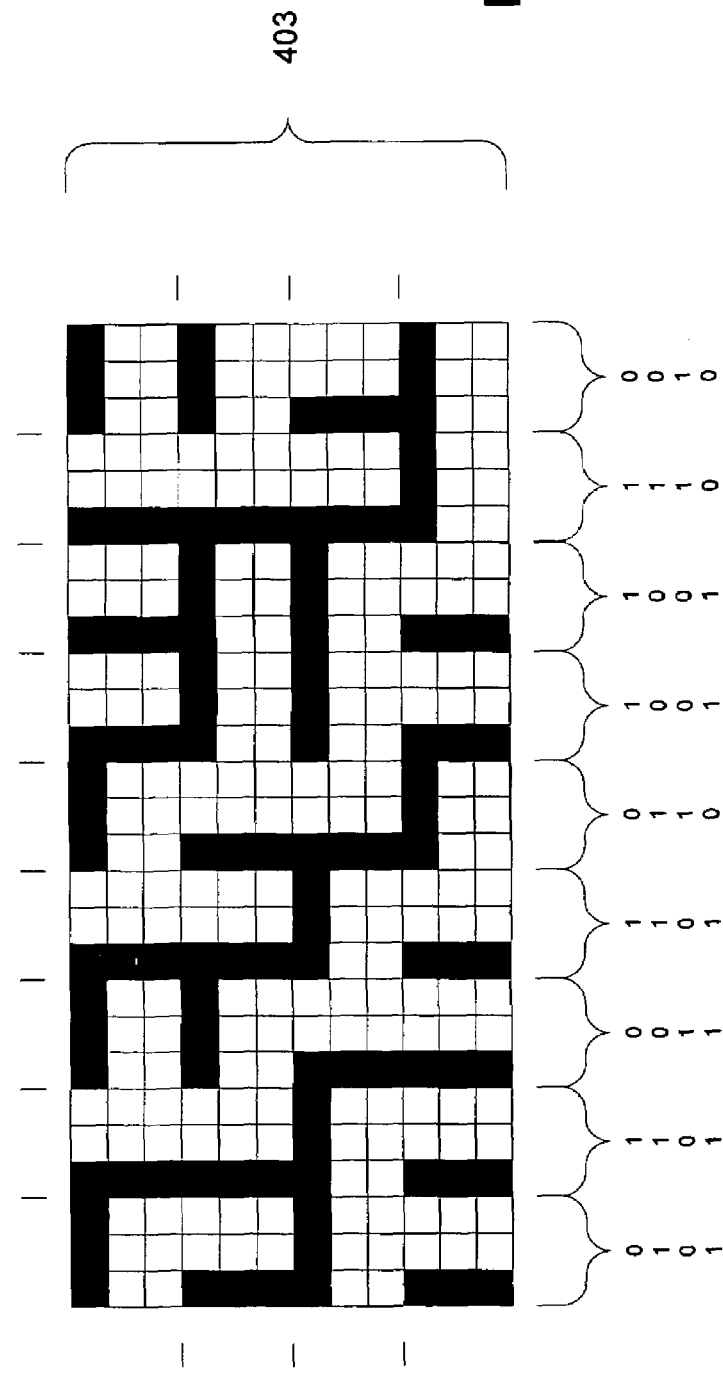
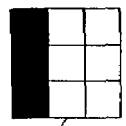 0
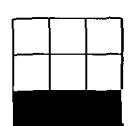 1
Figure 4A
Figure 4B

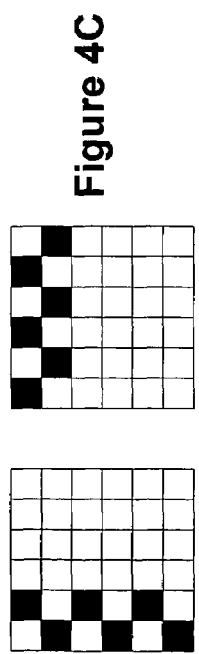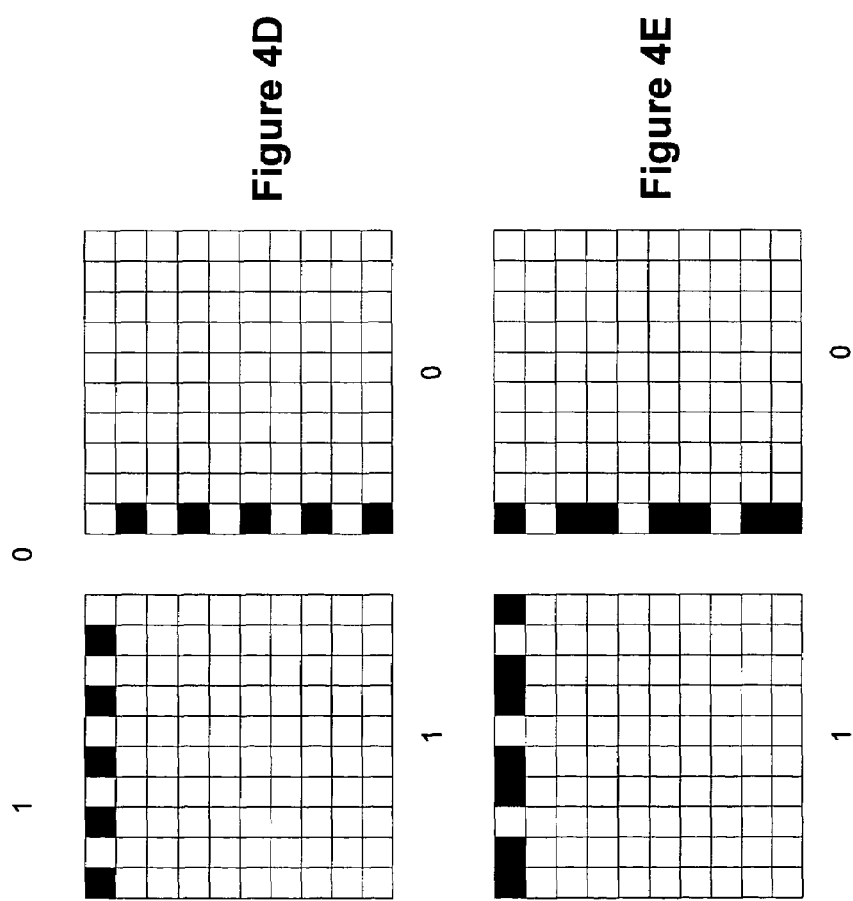

$$+\theta = o\begin{cases} 0 - no\ a \\ \dfrac{\pi}{2} - no\ b \\ \pi - no\ c \\ \dfrac{3\pi}{2} - no\ d \end{cases}$$

POSITIONALLY ENCODED DOCUMENT IMAGE ANALYSIS AND LABELING

TECHNICAL FIELD

Embodiments of the invention relate to interaction between a positionally encoded medium and a digital pen. More particularly, embodiments of the invention relate to labeling images of documents, which contain positionally encoded information, based on a degree to which the document's content occludes the position-encoding information.

BACKGROUND OF THE INVENTION

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

One technique of capturing handwritten information is by using a pen whose location may be determined during writing. One pen that provides this capability is the Anoto pen by Anoto Inc. This pen functions by using a camera to capture an image of paper encoded with a predefined pattern. An example of the image pattern is shown in FIG. 21. This pattern is used by the Anoto pen (by Anoto Inc.) to determine a location of a pen on a piece of paper. However, it is unclear how efficient the determination of the location is with the system used by the Anoto pen. To provide efficient determination of the location of the captured image, a system is needed that provides efficient decoding of the captured image.

When annotating a document, a user may mark the document by moving a pen tip with respect to the document. The path of the pen tip may comprise a plurality of strokes, where each stroke corresponds to a series of captured images. Hence, efficiently identifying the path of the pen in order to process the annotation on a document would be desirable.

Portions of the positionally encoded information, such as a watermarked maze pattern, may be occluded by the document's content, such as text and/or graphics. When a document's content occludes a relatively small amount (or none) of the position-encoding information in an area of a document, then the area's location within the document can be determined efficiently without a need to perform costly computations to determine the location. When the document's content occludes a relatively large amount of the position-encoding information in an area of the document, however, more computationally intensive techniques may need to be used to determine the area's location within the document.

Accordingly, techniques for distinguishing cases in which a relatively small amount of the position-encoding information is occluded from cases in which a relatively large amount is occluded would be desirable to increase the efficiency with which users are able to interact with documents containing positionally encoded information.

SUMMARY OF THE INVENTION

Embodiments of the invention relate to analyzing document images, which contain positionally encoded information, such as maze patterns, and labeling the captured images. The results of such document analysis may be used for efficiently determining a location of a camera-captured image within a positionally encoded document.

A system includes an image capture module and an analysis-and-labeling module. The analysis-and-labeling module receives, as input, captured-image data output by the image-capture module and off-line training data; performs analysis-and-labeling processing; and outputs image-label information.

Printed documents are watermarked with maze patterns. Such maze patterns may be occluded by a document's content, such as text. Depending on the degree of such occlusion, it may not be possible to extract enough position-encoding bits from a camera-captured image to determine the camera-captured image's location within the document.

Watermarked document images are analyzed and labeled. The analysis and labeling relates to an ability to determine the x-y position within a watermarked document based on the degree of visibility of the maze pattern in a particular location within the document.

Additional features and advantages of the invention will be apparent upon reviewing the following detailed description.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

FIGS. 5A through 5D show four possible resultant corners associated with the encoding system according to FIGS. 4A and 4B.

DETAILED DESCRIPTION OF THE INVENTION

Aspects of the present invention relate to determining the location of a captured image in relation to a larger image. The location determination method and system described herein may be used in combination with a multi-function pen.

The following is separated by subheadings for the benefit of the reader. The subheadings include: terms, general-purpose computer, image capturing pen, encoding of array, decoding, error correction, location determination, and analysis and labeling of camera-captured images.

I. Terms

Pen—any writing implement that may or may not include the ability to store ink. In some examples, a stylus with no ink capability may be used as a pen in accordance with embodiments of the present invention.

Camera—an image capture system that may capture an image from paper or any other medium.

II. General Purpose Computer

Figure 1:
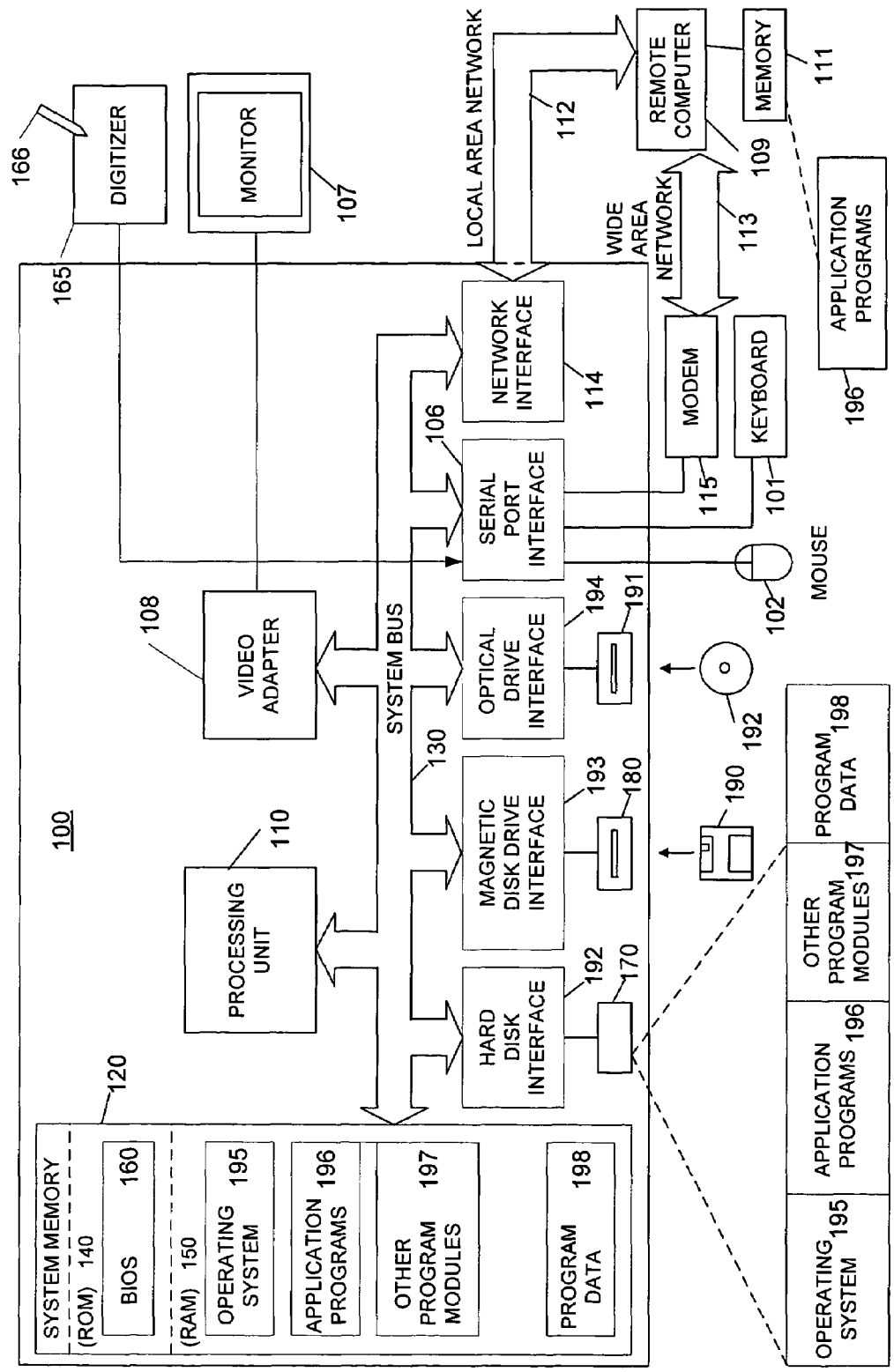
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

III. Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image flames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \to P}$ transforms position coordinates in the image captured by camera to position coordinates in the real image on the paper:

$$L_{paper} = F_{S \to P}(L_{Sensor})$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip})$$

The transformation $F_{S \to P}$ may be estimated as an affine transform. This simplifies as:

$$F'_{S \to P} = \begin{Bmatrix} \dfrac{s_x \sin\theta_y}{\cos\theta_x \sin\theta_y - \cos\theta_y \sin\theta_x}, & -\dfrac{s_x \cos\theta_y}{\cos\theta_x \sin\theta_y - \cos\theta_y \sin\theta_x}, & 0 \\ -\dfrac{s_y \sin\theta_x}{\cos\theta_x \sin\theta_y - \cos\theta_y \sin\theta_x}, & \dfrac{s_y \cos\theta_x}{\cos\theta_x \sin\theta_y - \cos\theta_y \sin\theta_x}, & 0 \\ 0, & 0, & 1 \end{Bmatrix}$$

as the estimation of $F_{S \to P}$, in which $\theta_x$, $\theta_y$, $s_x$, and $s_y$ are the rotation and scale of two orientations of the pattern captured at location 204. Further, one can refine $F'_{S \to P}$ by matching the captured image with the corresponding real image on paper. "Refine" means to get a more precise estimation of the transformation $F_{S \to P}$ by a type of optimization algorithm referred to as a recursive method. The recursive method treats the matrix $F'_{S \to P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \to P}$. From this transformation, one can obtain the location of the virtual pen tip $L_{virtual-pentip}$:

$$L_{virtual-pentip} = F_{P \to S}(L_{pentip})$$

where $L_{pentip}$ is initialized as (0, 0) and $$F_{P \to S} = (F_{S \to P})^{-1}$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ may be determined.

The location of the virtual pen tip $L_{virtual-pentip}$ is now known. One can also obtain the transformation $F_{S \to P}$ from the images captured. Finally, one can use this information to determine the location of the real pen tip $L_{pentip}$:

$$L_{pentip} = F_{S \to P}(L_{virtual-pentip})$$

IV. Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

IV.A. Sequence Construction

A sequence of numbers may be used as the starting point of the encoding system. For example, a sequence (also referred to as an m-sequence) may be represented as a q-element set in field $F_q$. Here, $q=p^n$ where $n \geq 1$ and p is a prime number. The sequence or m-sequence may be generated by a variety of different techniques including, but not limited to, polynomial division. Using polynomial division, the sequence may be defined as follows:

$$\frac{R_l(x)}{P_n(x)}$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n as the order of the sequence.

The process described above is but one of a variety of processes that may be used to create a sequence with the window property.

IV.B. Array Construction

The array (or m-array) that may be used to create the image (of which a portion may be captured by the camera) is an extension of the one-dimensional sequence or m-sequence. Let A be an array of period $(m_1, m_2)$, namely $A(k+m_1,l)=A(k,l+m_2)=A(k,l)$. When an $n_1 \times n_2$ window shifts through a period of A, all the nonzero $n_1 \times n_2$ matrices over $F_q$ appear once and only once. This property is also referred to as a "window property" in that each window is unique. A widow may then be expressed as an array of period $(m_1, m_2)$ (with $m_1$ and $m_2$ being the horizontal and vertical number of bits present in the array) and order $(n_1, n_2)$.

A binary array (or m-array) may be constructed by folding the sequence. One approach is to obtain a sequence then fold it to a size of $m_1 \times m_2$ where the length of the array is $L=m_1 \times m_2 = 2^n-1$. Alternatively, one may start with a predetermined size of the space that one wants to cover (for example, one sheet of paper, 30 sheets of paper or the size of a computer monitor), determine the area $(m_1 \times m_2)$, then use the size to let $L \geq m_1 \times m_2$, where $L=2^n-1$.

Figures 3D, 3E, 3F:
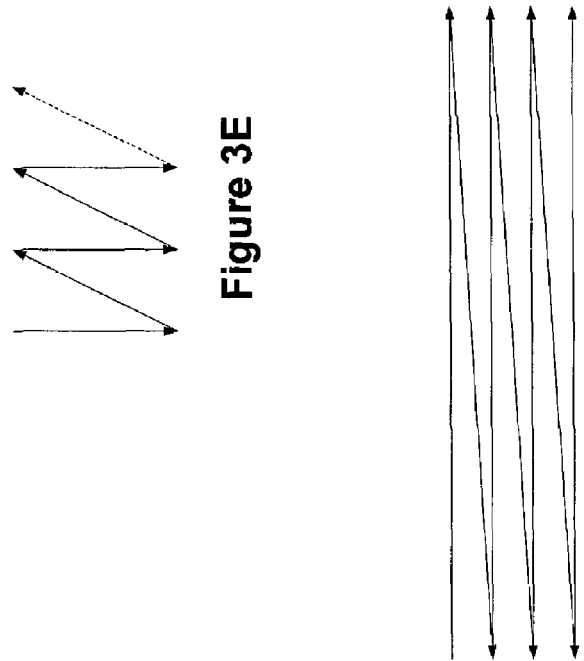

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2)=1$ and $L=m_1 \times m_2$, is created from the sequence $\{a_i\}$ by letting each bit of the array be calculated as shown by equation 1:

$$b_{kl} = a_i, \text{ where } k=i \bmod(m_1), \\ l=i \bmod(m_2), i=0,\ldots,L-1. \quad (1)$$

This folding approach may be alternatively expressed as laying the sequence on the diagonal of the array, then continuing from the opposite edge when an edge is reached.

Figure 11:
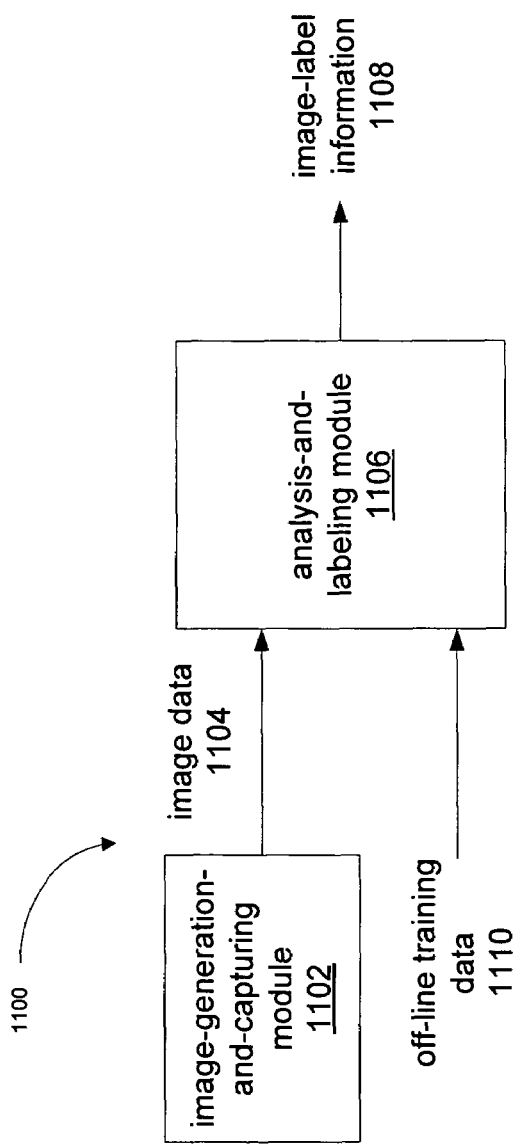
FIG. 11 depicts an image-capture module and an analysis-and-labeling module in accordance with various embodiments of the invention.

FIG. 4A shows sample encoding techniques that may be used to encode the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}$$

V. Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

For the determination of the orientation of the captured image relative to the whole encoded area, one may notice that not all the four conceivable corners shown in FIG. 5A-5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Figures 6, 7:
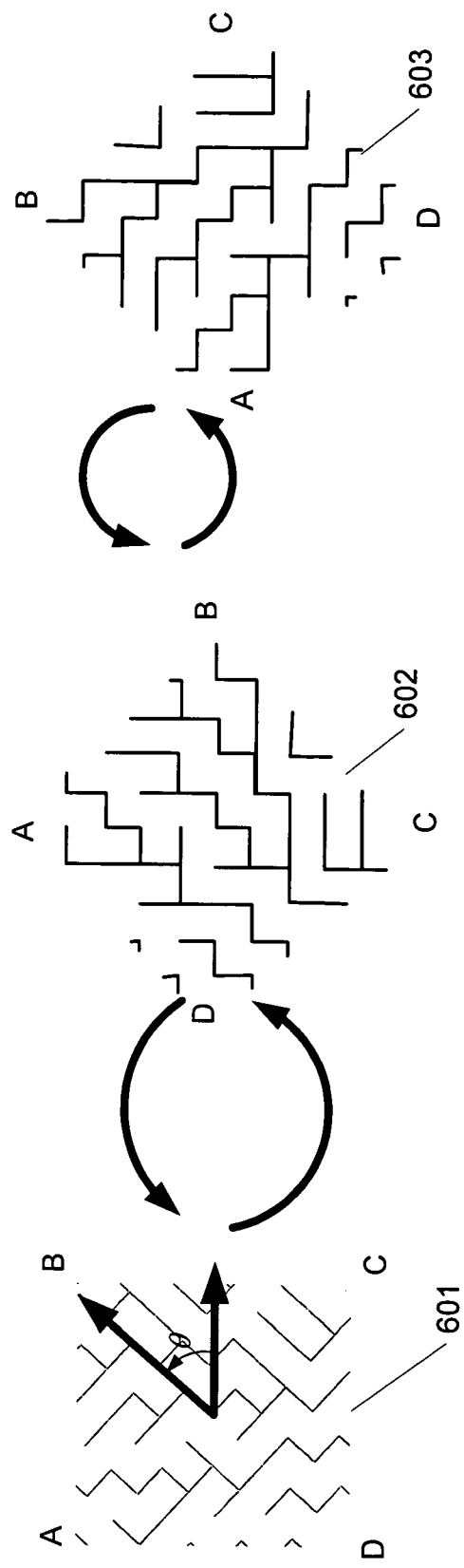
FIG. 6 shows rotation of a captured image portion in accordance with embodiments of the present invention.
FIG. 7 shows various angles of rotation used in conjunction with the coding system of FIGS. 4A through 4E.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counterclockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0\ b_1\ b_2\ \ldots\ b_{K-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this $s_d$ indirectly. The polynomials modulo $P_n(x)$ form a field. It is guaranteed that $x^s \equiv r_0+r_1 x+ \ldots r_{n-1} x^{n-1}\ \mathrm{mod}(P_n(x))$. Therefore, we may find $(r_0, r_1, \ldots, r_{n-1})$ and then solve for s.

The relationship $x^s \equiv r_0+r_1 x+ \ldots r_{n-1} x^{n-1}\ \mathrm{mod}(P_n(x))$ implies that $R=r_0+r_1 T(I)+ \ldots +r_{n-1} T^{n-1}(I)$. Written in a binary linear equation, it becomes:

$$R = r^t A \quad (2)$$

where $r=(r_0\ r_1\ r_2\ \ldots\ r_{n-1})^t$, and $A=(I\ T(I)\ \ldots\ T^{n-1}(I))^t$ which consists of the cyclic shifts of I from 0-shift to (n−1)-shift. Now only sparse K bits are available in R to solve r. Let the index differences between $b_i$ and $b_0$ in R be $k_i$, i=1,2, . . . ,k−1, then the $1^{st}$ and $(k_i+1)$-th elements of R, i=1,2, . . . ,k−1, are exactly $b_0$, $b_1$, . . . , $b_{k-1}$. By selecting the $1^{st}$ and $(k_i+1)$-th columns of A, i=1,2, . . . k−1, the following binary linear equation is formed:

$$b^t = r^t M \quad (3)$$

where M is an n×K sub-matrix of A.

If b is error-free, the solution of r may be expressed as:

$$r^t = \tilde{b}^t \tilde{M}^{-1} \quad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568) to find s so that $x^s \equiv r_0 + r_1 x + \ldots r_{n-1} x^{n-1} \mod(P_n(x))$.

As matrix A (with the size of n by L, where $L=2^n-1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L=2^n-1$ is the length of the m-sequence).

VI. Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\tilde{M}$ of M being non-degenerate is high.

When the n bits chosen are all correct, the Hamming distance between $b^t$ and $r^t M$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
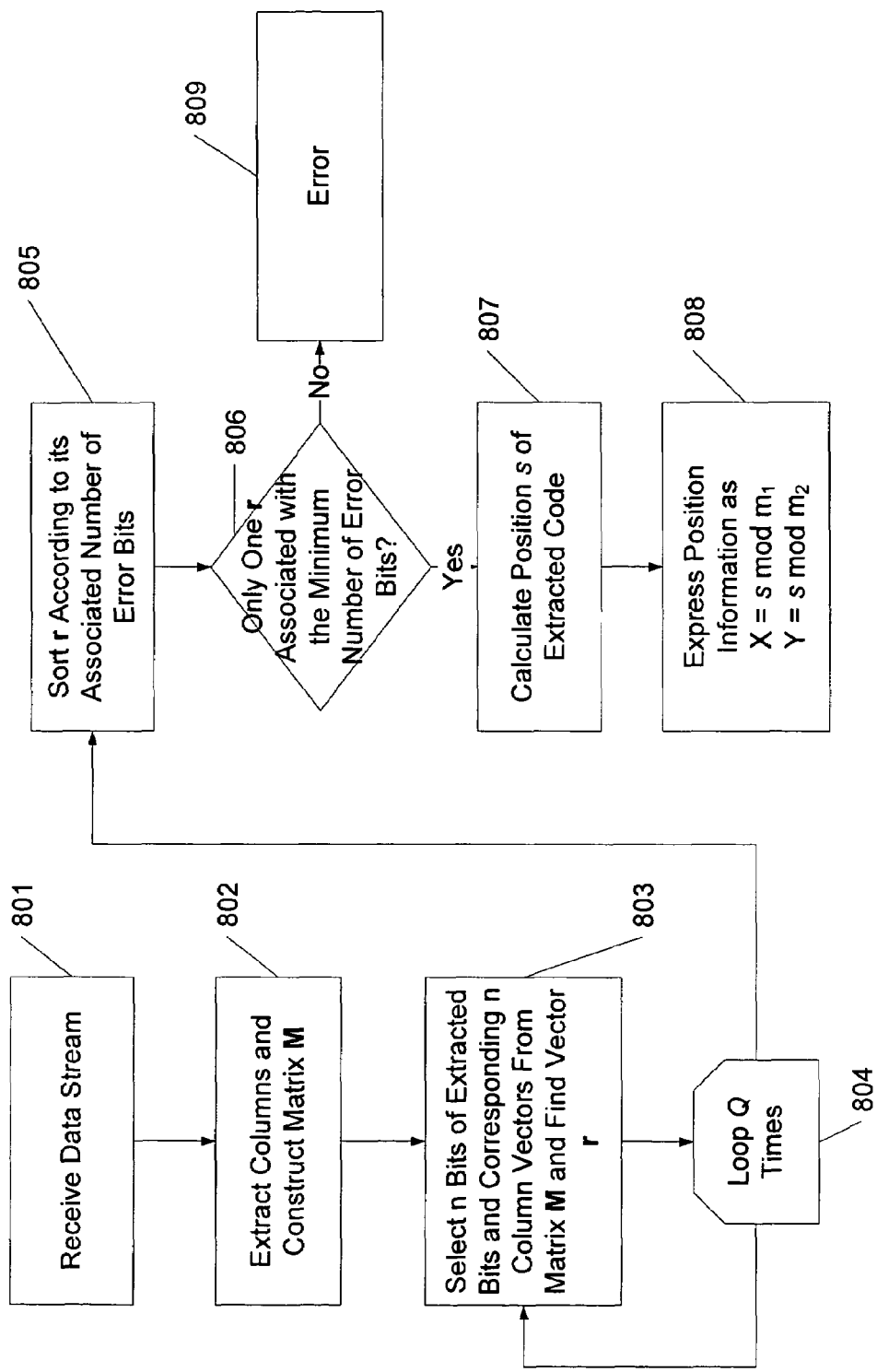
FIG. 8 shows a process for determining the location of a captured array in accordance with embodiments of the present invention.

FIG. 8 depicts a process that may be used to determine a location in a sequence (or m-sequence) of a captured image. First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating the decoding process failed. If not, the position s of the extracted bits in the sequence (or m-sequence) is calculated in step 807, for example, by using the Pohig-Hellman-Silver algorithm.

Next, the (X,Y) position in the array is calculated as: x=s mod $m_1$ and y=s mod $m_2$ and the results are returned in step 808.

VII. Location Determination

Figure 9:
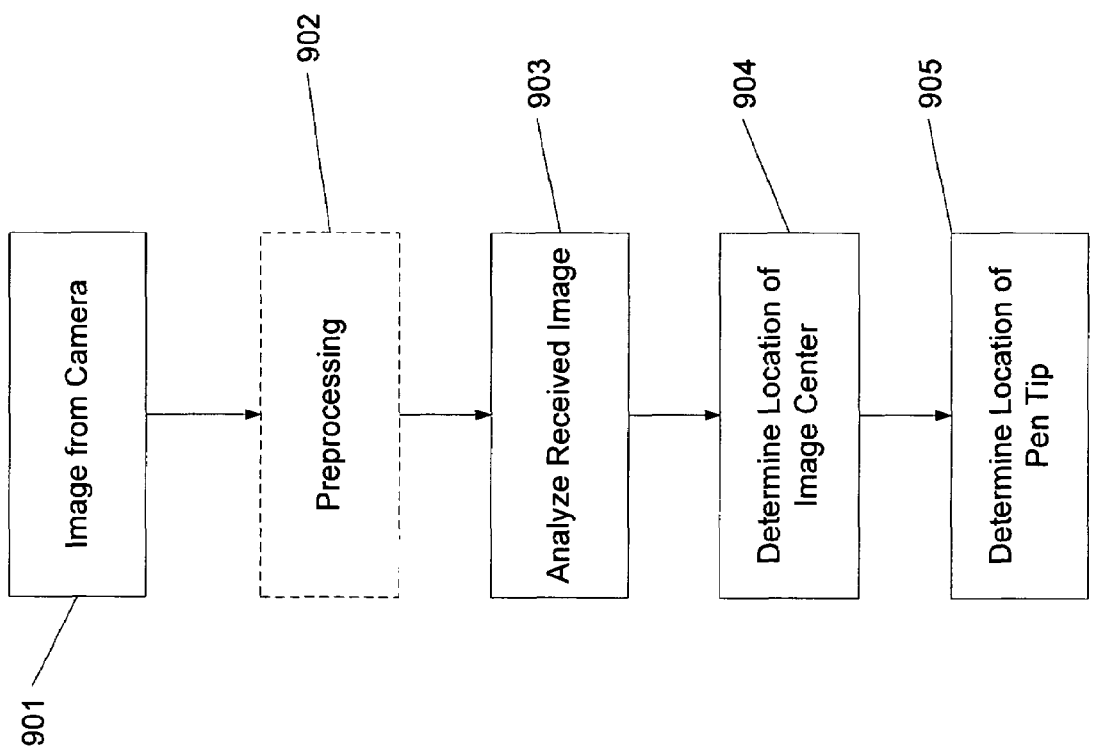
FIG. 9 shows a method for determining the location of a captured image in accordance with embodiments of the present invention.

FIG. 9 shows a process for determining the location of a pen tip. The input is an image captured by a camera and the output may be a position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
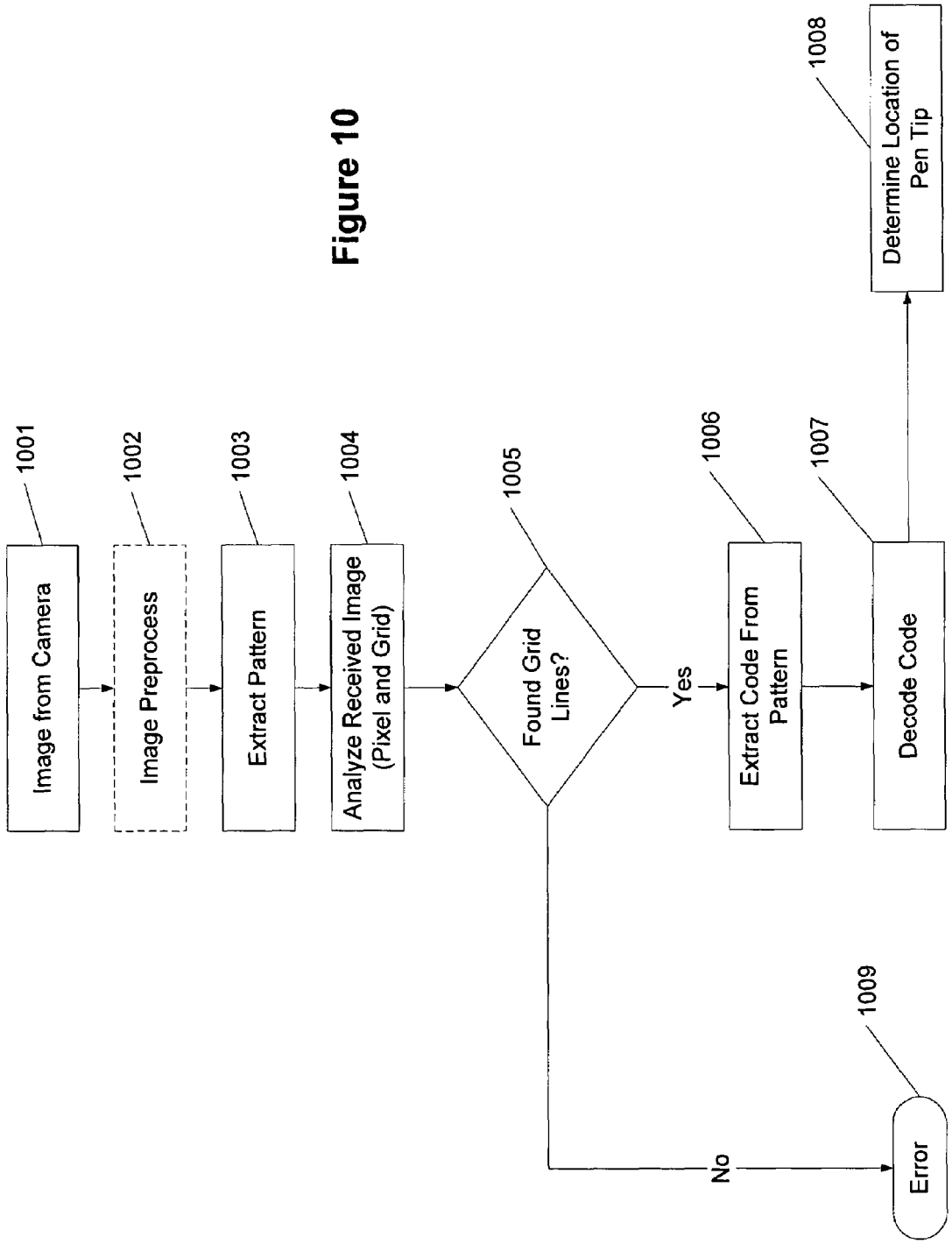
FIG. 10 shows another method for determining the location of captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and the angle θ.

Next, the received image is analyzed in step 1004 to determine the underlying grid lines. If grid lines are found in step 1005, then the code is extracted from the pattern in step 1006. The code is then decoded in step 1007 and the location of the pen tip is determined in step 1008. If no grid lines were found in step 1005, then an error is returned in step 1009.

VIII. Watermarked Document Images: Generation, Analysis and Labeling

Embodiments of the invention relate to analyzing document images, which contain positionally encoded information, such as maze patterns, and labeling the images. The results of such document analysis may be used for efficiently determining a location of a camera-captured image within a positionally encoded document.

Referring to FIG. 11, a system 1100, in accordance with various embodiments of the invention, includes an image-generation-and-capturing module 1102 and an analysis-and-labeling module 1106. Suitable techniques for capturing images for subsequent analysis and labeling are discussed above in section III, entitled Image Capturing Pen, and below in this section and in section VIII.A, entitled Generating Watermarked Gray-Scale Document Images. The analysis-and-labeling module 1106 receives, as input, image data 1104 output by the image-generation-and-capturing module 1102 and off-line training data 1110; performs analysis-and-labeling processing, as discussed in more detail below; and outputs image-label information 1108.

In accordance with various embodiments of the invention, the size of the camera 203's captured image is 32*32 pixels. The order of the embedded m-array, which is used for positionally encoding positions on the surface 207, is 36, namely, the size of the m-array is $(2^{18}+1)*(2^{18}-1)$. Therefore, to decode a unique x-y position from a sub-block m-array, the number of bits of a sub-block used for determining a position on the surface 207 should be at least 36.

In accordance with various embodiments of the invention, printed documents are watermarked with maze patterns. Such maze patterns may be occluded by a document's content, such as text. Depending on the degree of such occlusion, it may not be possible to extract enough m-array bits from a camera-captured image to determine the camera-captured image's location within the document.

In accordance with various embodiments of the invention, watermarked document images are analyzed and labeled. The analysis and labeling relates to an ability to determine the x-y position within a watermarked document based on the degree of visibility of the maze pattern cells in a particular location within the document.

VIII.A. Generating Watermarked Gray-Scale Document Images

Figure 12:
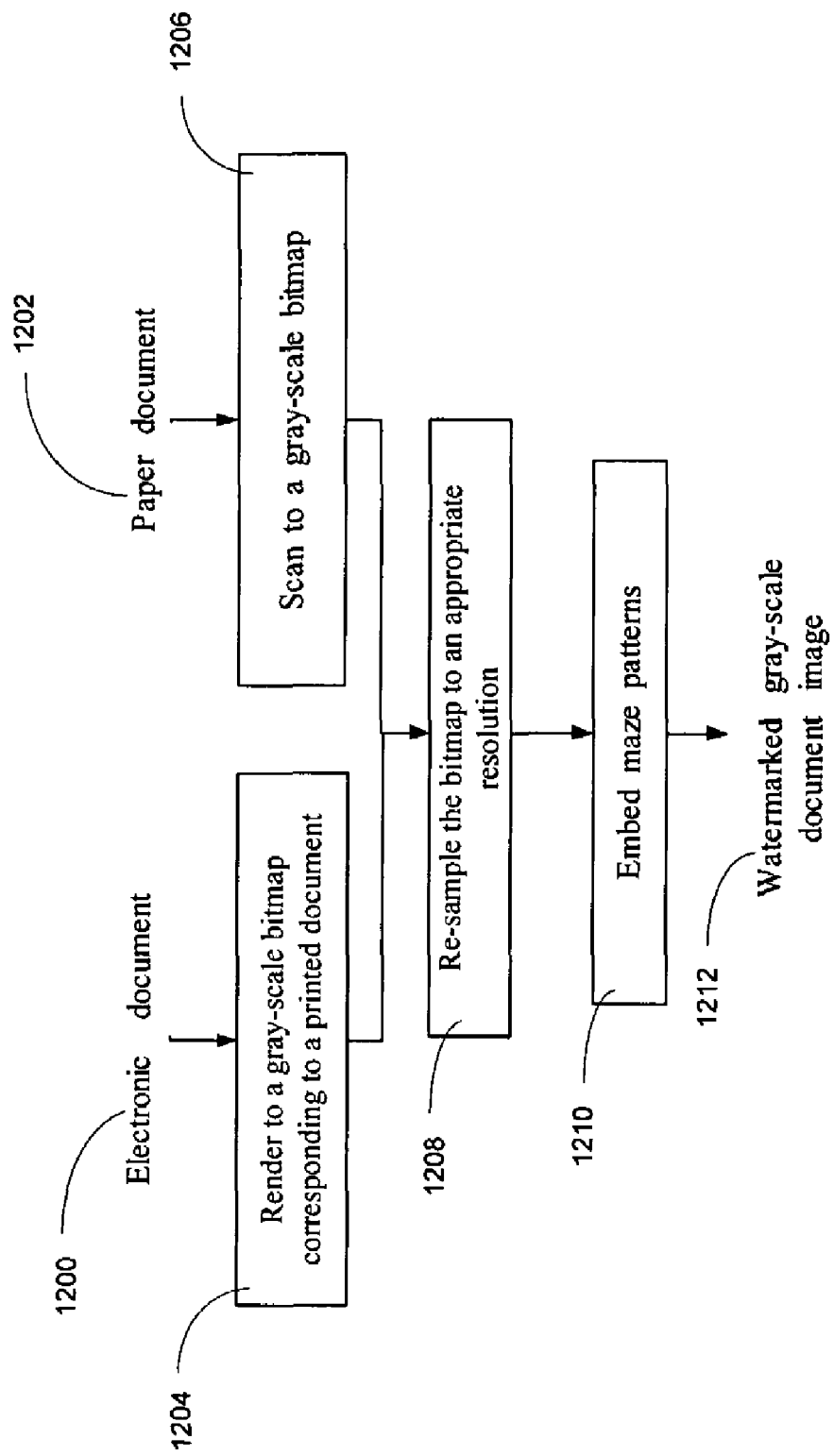
FIG. 12 depicts steps for generating a watermarked gray-scale document image, which may be analyzed and labeled in accordance with various embodiments of the invention.

FIG. 12 depicts steps for generating a watermarked gray-scale document image, which may be analyzed and labeled in accordance with various embodiments of the invention. Document images are obtained, such as by rendering an electronic document to a bitmap corresponding to a printed document, as shown at 1200 and 1204, or by scanning a paper document, as shown at 1202 and 1206. The bitmaps are then re-sampled to an appropriate resolution, as shown at 1208. Determination of the resolution is based on the following considerations: (1) the resolution of the document image shouldn't be less than that of the captured image, because when the location of the captured image cannot be determined by m-array decoding, the captured image will be matched with the watermarked gray-scale document image in order to determine the location; (2) one printed maze pattern cell should be mapped to an integer number of document image pixels so that the matching algorithm can work effectively. For example, if the resolution of the camera is 0.15 mm/pixel, i.e. 0.15 mm in the physical world is mapped to one camera pixel, the printed maze pattern cell size is 0.45 mm*0.45 mm, i.e. a printed maze pattern cell is mapped to 3*3 pixels on the camera sensor, the resolution of the document image should also be set to 0.15 mm/pixel so that a printed maze pattern cell will be mapped to a 3*3 pixel area in the document image.

Figure 13:
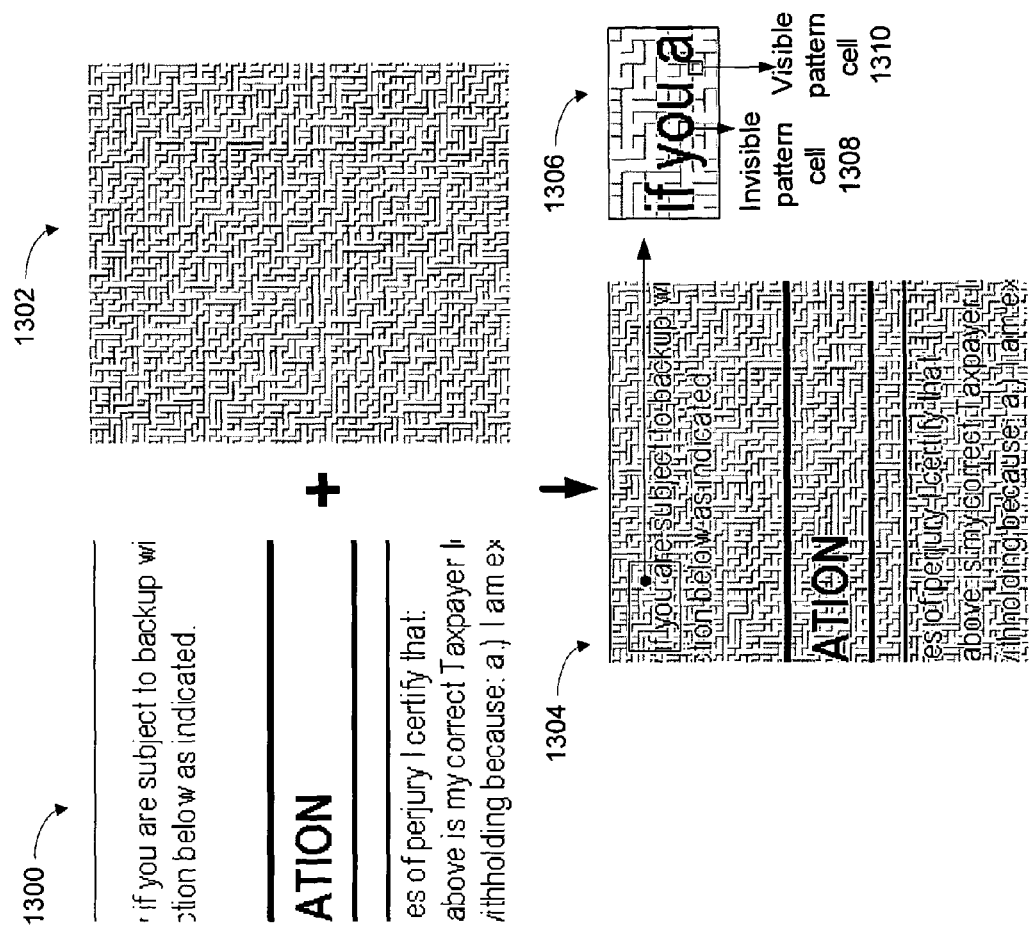
FIG. 13 depicts an image of a portion of a document's content, a portion of a positionally encoded maze pattern, the content and the maze pattern combined, and a zoomed-in view of a portion of the content and the maze pattern.

The obtained images are then watermarked. FIG. 13 depicts an image of a portion of a document's content 1300, a portion of a positionally encoded maze pattern 1302, the content and the maze pattern combined 1304, and a zoomed-in view of a portion of the content and the maze pattern 1306 showing: (1) a location at which a maze pattern cell is not visible because it is occluded by overlaid text 1308, and (2) a location at which a maze pattern cell is not occluded by document content and is, therefore, visible 1310.

VIII.B. Document Image Analysis and Labeling

In accordance with various embodiments of the invention, document images are analyzed by dividing the image into relatively small blocks having substantially the same size as maze pattern cells; determining whether these small blocks are occluded by document content, such as document text; and, for each pixel, counting the number of completely visible blocks in a neighboring window with the pixel as the center of the window; and labeling the pixel based on the number. The neighboring window may have substantially the same size as the size of the camera 203's captured image, i.e. 32 by 32 pixels.

Note that the aforementioned process doesn't require the gray-scale document image to be watermarked, i.e. content combined with the maze patterns. As long as the document image is divided into relatively small blocks having substantially the same size as maze pattern cells, analyzing the occlusion of the maze pattern cells by document content is equivalent to analyzing the occlusion of the blocks by document content.

Figure 14:
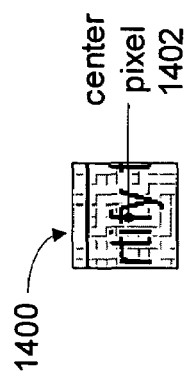
FIG. 14 shows a sub-window, and the sub-window's center pixel, of the combined document and maze pattern shown in FIG. 13.

FIG. 14 shows an example of such a 32 by 32 pixel neighboring window 1400 and its center pixel 1402. In accordance with various embodiments of the invention, the pixels of document images may be labeled as one of four types:

Type I: 32 by 32 pixel neighboring window (with the pixel under consideration as the center) contains substantially only positionally encoded maze pattern cells.

Type II: 32 by 32 pixel neighboring window contains 60 or more visible maze pattern cells.

Type III: 32 by 32 pixel neighboring window contains 36 to 60 visible maze pattern cells.

Type IV: 32 by 32 pixel neighboring window contains 35 or less visible maze pattern cells.

In accordance with various embodiments of the invention, when the center of a captured image is located at type I or type II areas, the location of the image within a document may be uniquely determined by m-array decoding.

Figure 15:
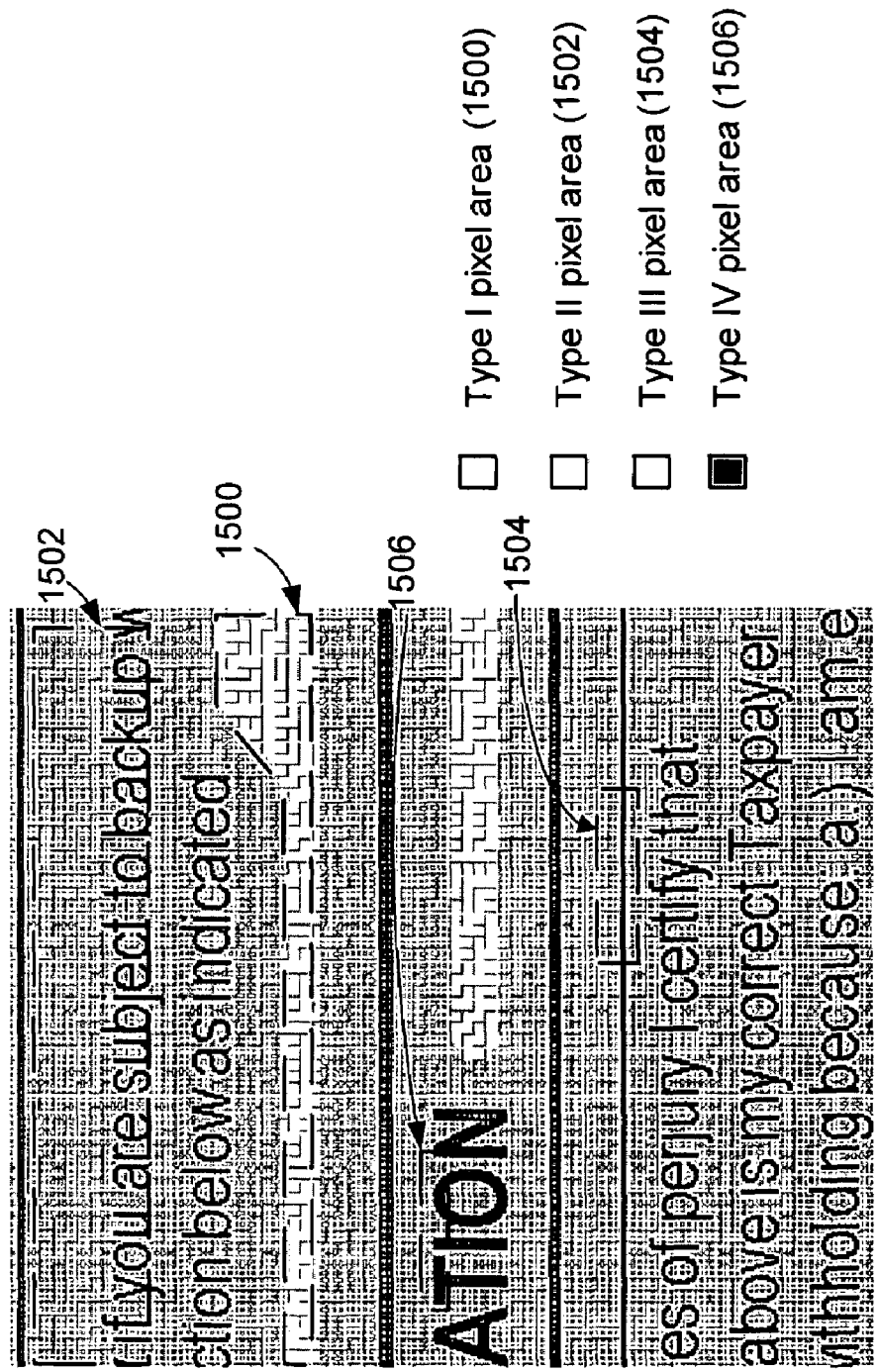
FIG. 15 shows a document-analysis result of an example document in accordance with various embodiments of the invention.

FIG. 15 shows the document analysis result of an example document wherein areas of the document are colored (or shaded) differently to represent which type (i.e, type I, II, III, or IV) the portion of the document has been labeled with based on the amount of maze-pattern cells that are visible in the 32 by 32 neighboring window of each pixel.

Figures 16, 17:
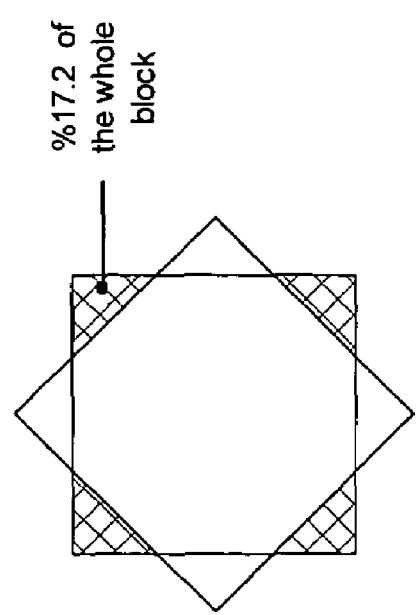
FIG. 16 depicts a camera-captured image having a non-zero rotation angle and a 45 degree rotation angle.
FIG. 17 depicts the two convolutional kernels that form the Sobel edge operator.

Note that in counting the number of visible maze pattern cells, the 32 by 32 pixel neighboring window should have been rotated 360 degrees to account for the fact that the camera may have captured an image of the document at any angle. For ease of implementation, however, only a non-tilted view is analyzed, and the error caused by a tilted angle is accounted for in the threshold of determining the type of the pixel. For example, FIG. 16 depicts a case in which the captured image is rotated by 45 degrees. This is the worst-case scenario where a maximum of 17.2% of the visible maze pattern cells may have been lost. Even so, type II pixels will still have at least 49 (=60*(1-17.2%)) visible maze pattern cells, which will allow for a unique x-y position determined by m-array decoding. In other words, if a pixel is labeled as type I or II, there should be a sufficient number of visible maze pattern cells no matter at which angle the camera may have captured an image, to determine the x-y position with m-array decoding. Consequently, if a captured image fails to be decoded, it is most likely that it is located at type III or IV areas.

If x-y positions cannot be decoded from a sequence of images of a pen stroke because not enough maze-pattern cells are visible, a search algorithm may be used for determining the location of images, such as in the type III and IV pixel areas, within the document. Using such a search algorithm only on type III and IV areas decreases the computing cost for determining the location of images relative to using the search algorithm for substantially all parts of the document. For example, in the example document of FIG. 15, only 13.7% of the area is labeled as type III (11.1%) or type IV (2.6%). The computation cost associated with searching the entire document is much higher than that of searching only the type III and IV areas. In one implementation, it may take more than 10 seconds to search the entire document, whereas less than 1 second is needed to search type III and IV areas only. Document image analysis decreases the computation cost greatly.

IX. Labeling of Camera-Captured Images

Camera-captured images may also be labeled with the four types discussed above in section VIII.B., entitled Document Image Analysis and Labeling. A determination may be made as to whether a camera-captured image contains substantially only positionally encoded maze patterns. Stated differently, a determination may be made as to whether or not the image is a type I image. This initial determination will be discussed in more detail below.

If a camera-captured image is not a type I image, then a positionally encoded maze pattern of the camera-captured image may be analyzed to determine a number of position-encoding bits that can be extracted from the image. The parameters of maze pattern grid lines (scale and rotation along each dimension, i.e. affine transform) are first calculated, and then the original direction (or quadrant) in which the maze pattern is embedded is determined. Consequently, the m-array bits information is determined based on the grid lines and bar directions. If the number of extracted bits is greater than approximately 60, the image is labeled as type II; if between approximately 36 and 60 bits are extracted, the image is labeled as type III; and, if fewer than approximately 36 bits are extracted, then the image is labeled as type IV. To categorize camera-captured images this way, a thresholding algorithm, which is discussed below in section IX.B., entitled Thresholding Algorithm, may be used to separate the maze pattern areas from text areas. Then, images may be labeled based on the number of extracted bits. The extracted bits from type I, II, and III may be used for determining the camera-captured image's x-y position within a larger document. Position-determination processing of this type may be omitted for Type IV images because they do not contain enough bits for x-y position decoding.

To determine whether an image contains substantially only positionally encoded maze patterns, as opposed to containing both document content and maze patterns, a feature called a support interval of gradient image histogram (SIGIH) may be used in accordance with various embodiments of the invention. SIGIH is used based on the knowledge that pure maze pattern images typically do not contain edges, whereas images with document content, such as text, typically contain edges, because the document content are often much darker than maze-pattern cells or blank areas.

IX.A. Feature Extraction

In accordance with various embodiments of the invention, a first step of feature extraction is a gradient operator, such as the Sobel edge operator or another gradient operator, may be used to obtain gradient images. Referring to FIG. 17, the two convolutional kernels, 1700 and 1702, form the Sobel edge operator. To use the Sobel edge operator, each pixel in an image is convolved with both of the convolutional kernels 1700 and 1702. One kernel responds maximally to a generally vertical edge and the other kernel responds maximally to a horizontal edge. A "vector sum" value of the two convolutions is taken as the output value for a particular pixel. The result is a gradient image.

Figure 18:
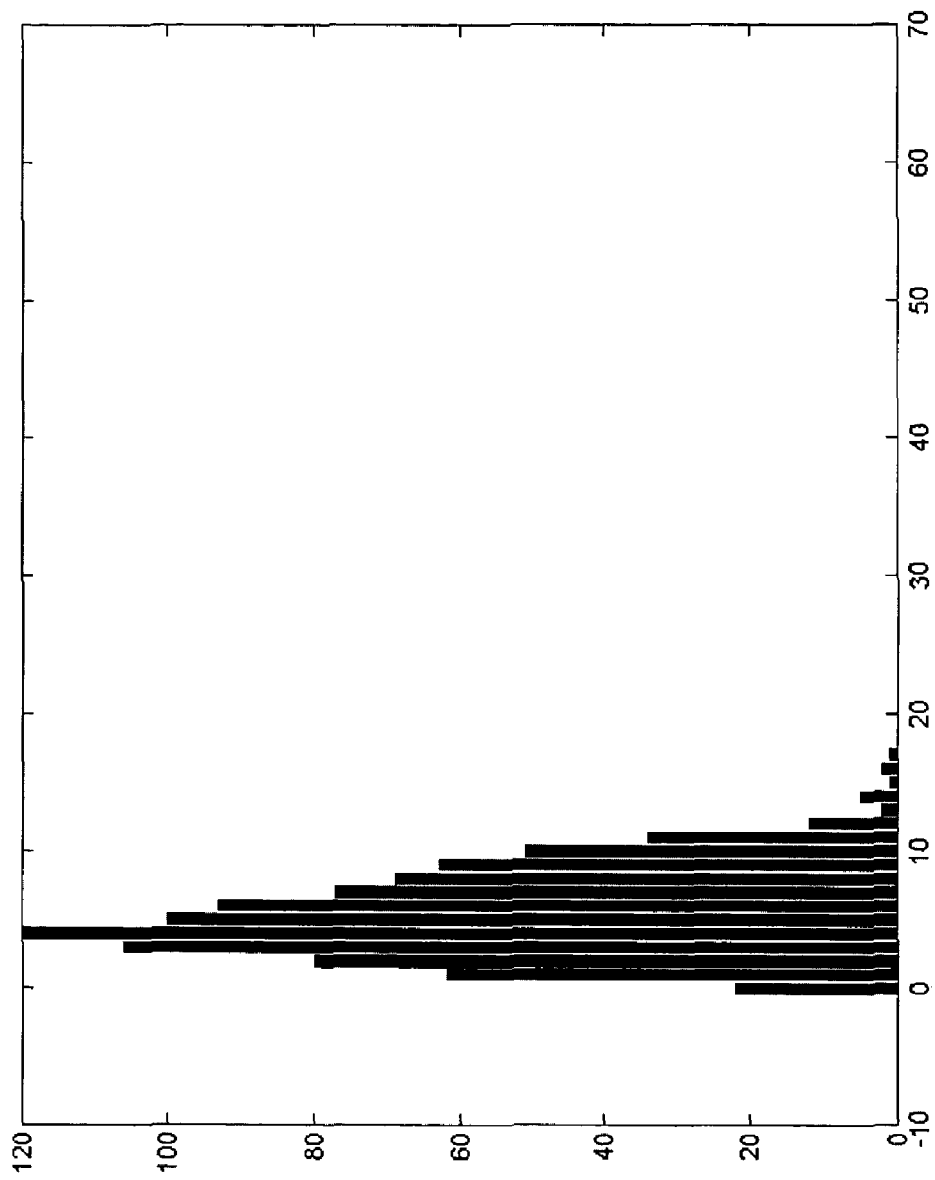
FIG. 18 shows a histogram of gradient images of a captured image containing only maze patterns.

A histogram of the gradient image produced by the gradient operator may be calculated. The support interval of the gradient image histogram (SIGIH) may then be obtained from the histogram of the gradient image. For example, FIG. 18 shows a histogram of the gradient image of a captured image containing only maze patterns. The SIGIH feature is 17, which is the largest number along the x-axis to have a non-zero value, for the histogram of FIG. 17.

Figure 19:
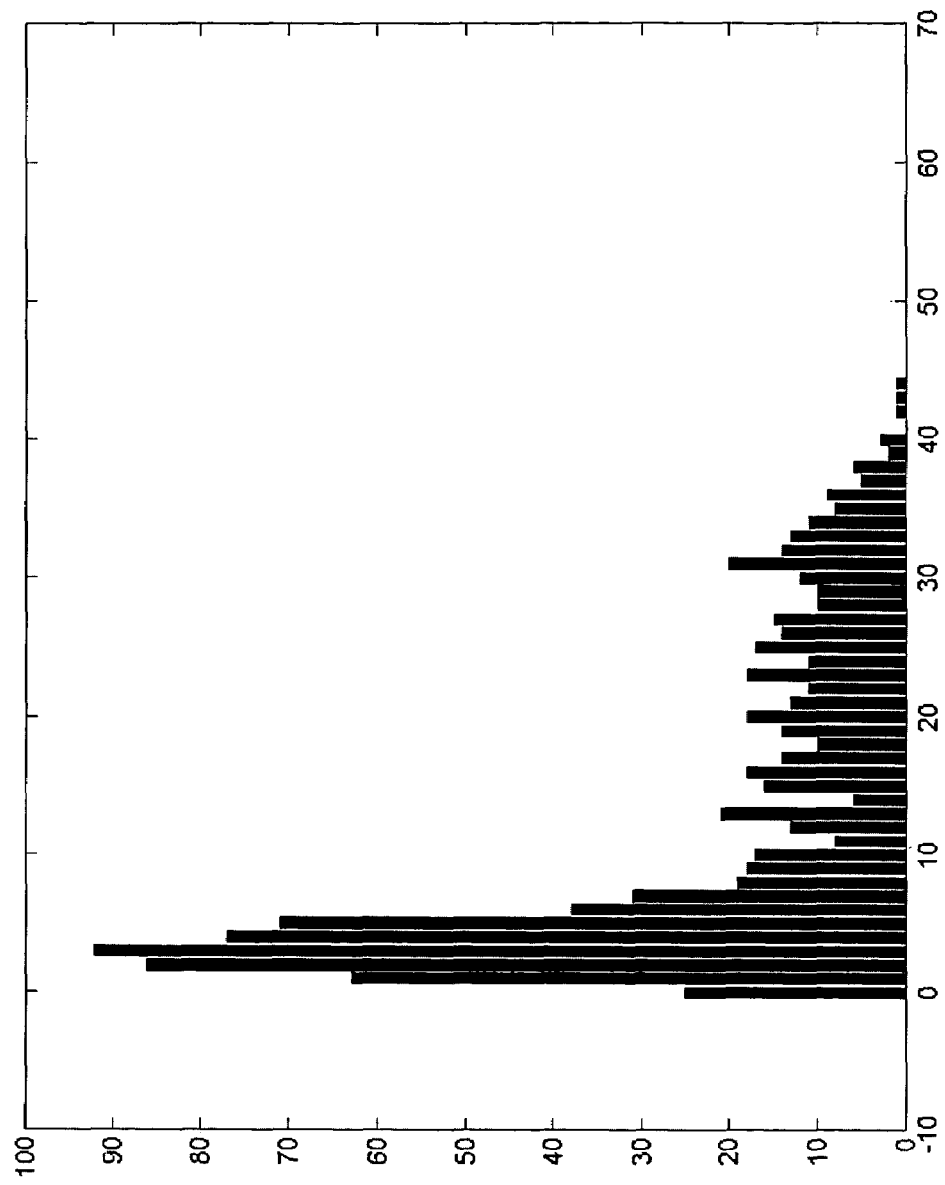
FIG. 19 shows a histogram of gradient images of a captured image containing document content.

FIG. 19 shows a histogram of the gradient image of a captured image containing document content, such as text and/or one or more drawings. The SIGIH feature is 44 for the histogram of FIG. 19.

IX.B. Thresholding Algorithm

A thresholding algorithm, for determining whether an image is type I or not, in accordance with various embodiments of the invention, may be divided into 2 sessions: (1) off-line training; and (2) on-line labeling.

IX.B.1. Off-Line Training

Figure 20:
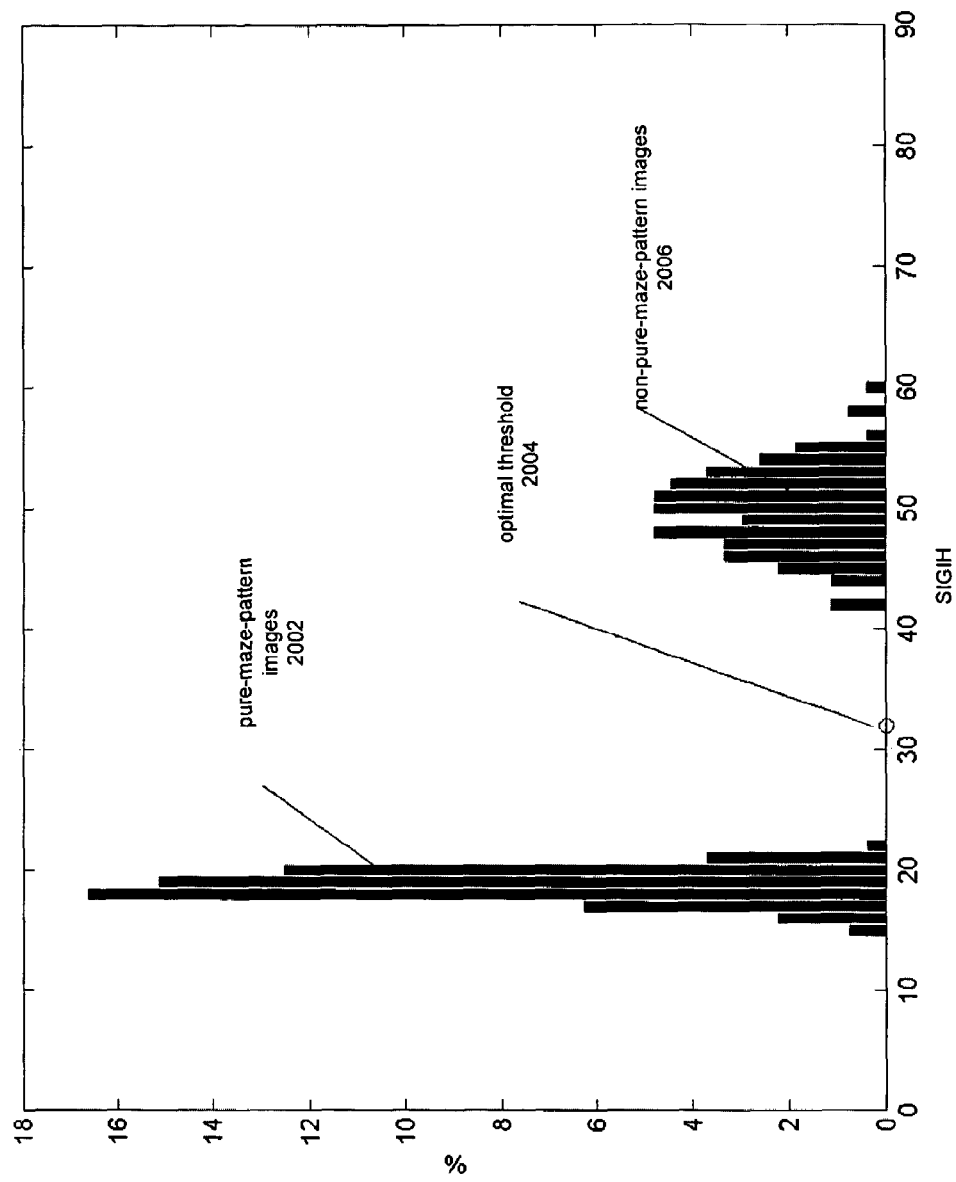
FIG. 20 shows an example result of off-line training, including a threshold selected for distinguishing between pure-maze-pattern images and images containing document content.
Figure 21:
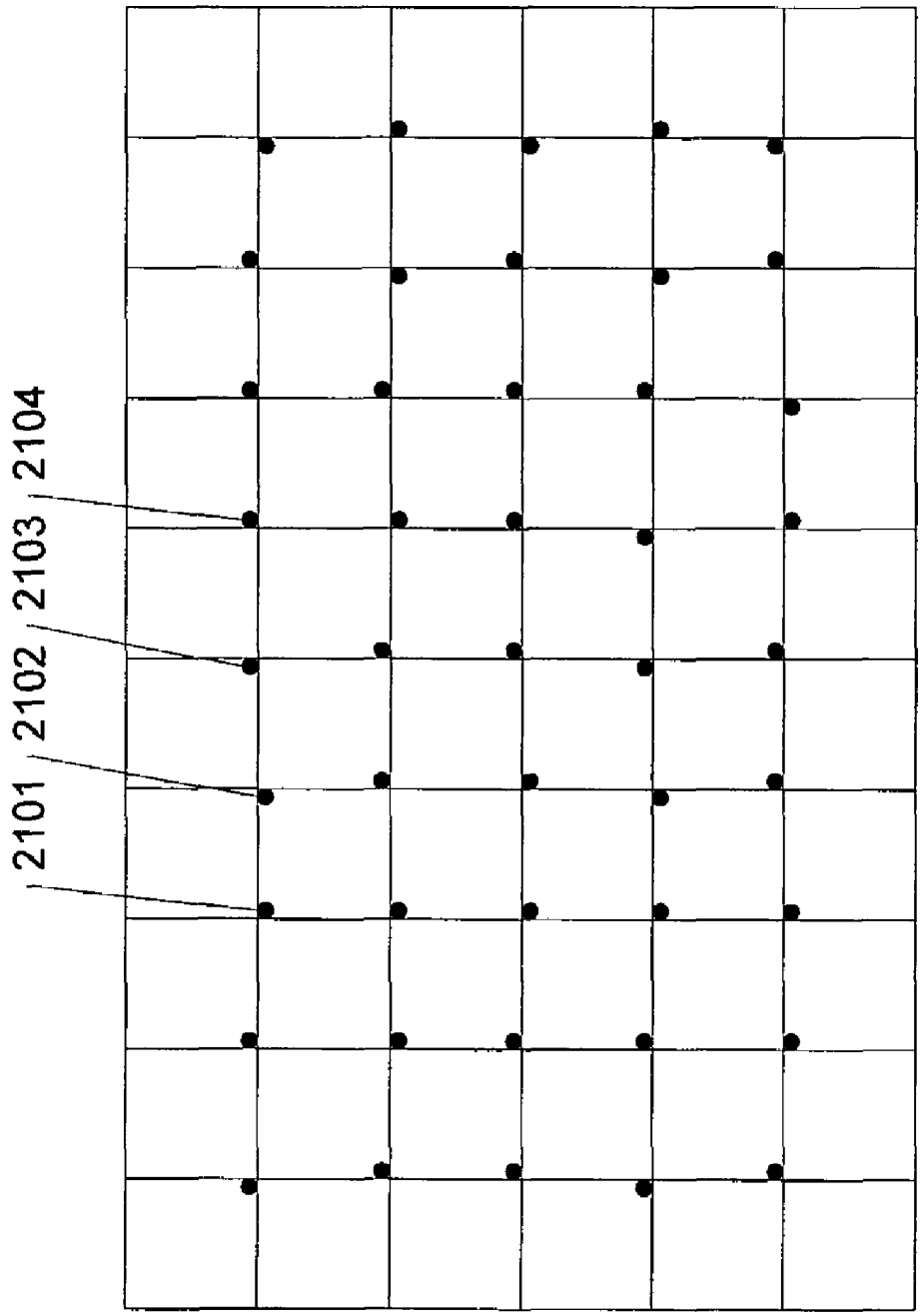
FIG. 21 shows a representation of encoding space in a document according to prior art.

In an offline training session, the SIGIH feature may be calculated for a relatively large number of images with known labels (i.e., types I, II, III, or IV). The SIGIH of pure-maze-pattern images is often lower than the SIGIH for images of other types. An optimal threshold η may be selected based on the results of processing the training data. For substantially all pure-maze-pattern images in the training set, their SIGIH are less than η, and for substantially all non-pure-maze-pattern images, their SIGIH are greater than η. FIG. 20 shows an example result of off-line training in which η, an optimal threshold 2004, is selected to be 32. Also shown are histogram bars 2002 corresponding to pure-maze-pattern images and histogram bars 2006 corresponding to non-pure-maze-pattern images (i.e., images that include document content).

IX.B.2. Online Labeling

During online labeling, each captured image's SIGIH is calculated. If the SIGIH is smaller than η, then the image is labeled as a type I image. Otherwise, if the SIGIH is greater than η, the image is labeled as a type other than type I (i.e., types II, III, and IV).

The discussion above relating to document analysis and labeling assumes that the contrast of captured images remains relatively consistent. Stated differently, it is assumed that the image sensor's amplifier and/or the camera's illumination conditions remain relatively consistent. If these conditions change non-trivially, new training may be performed to update the feature parameters.

X. Concluding Remarks

What has been described above is merely illustrative of the application of the principles of the invention. Those skilled in the art can implement other arrangements and methods without departing from the spirit and scope of the invention. Any of the methods of the invention can be implemented in software that can be stored on computer disks or other computer-readable media.

We claim:

1. A method of labeling a document image containing positionally encoded maze patterns for computationally efficient decoding, the method comprising:
   obtaining the document image;
   analyzing the document image to determine a number of position encoding bits that can be extracted from the document image, the analyzing including:
      dividing the document image into blocks having substantially a same size as maze pattern cells;
      determining whether the blocks are occluded by document content;
      counting, for each pixel in the document image, a number of completely visible blocks in a neighboring window with the pixel being as a center of the window; and
      labeling the pixel based on the number;
   performing a thresholding algorithm on the document image to determine if the document image is of a type selected from at least:
      a first type containing sufficient amount of visible positionally encoded maze patterns for a computationally efficient algorithm to decode the document image, and
      a second type containing document content that occludes at least a portion of the positionally encoded maze patterns, wherein the occlusion results in insufficient amount of maze patterns being visible for the computationally efficient algorithm to decode the document image;
   labeling the document image with the type based on the number of position encoding bits; and
   performing a search algorithm on the document image when an insufficient amount of maze patterns are visible.

2. The method of claim 1, wherein obtaining the document image further comprises: rendering an electronic document to a bitmap representation corresponding to a printed document.

3. The method of claim 1, wherein obtaining the document image further comprises: processing a scanned paper document.

4. The method of claim 1, wherein the second type is divided into a plurality of subtypes that represent distinct degrees of occlusion of the positionally encoded maze patterns by the document content.

5. A method of labeling a camera-captured image containing positionally encoded maze patterns for computationally efficient decoding, the method comprising:
   obtaining the camera-captured image;
   analyzing the camera-captured image to determine a number of position encoding bits that can be extracted from the camera-captured image, the analyzing including:
      dividing the camera-captured image into blocks having substantially the same size as maze pattern cells;
      determining whether the blocks are occluded by document content;
      counting, for each pixel in the camera-captured image, a number of completely visible blocks in a neighboring window with the pixel being as a center of the window; and
      labeling the pixel based on the number;
   performing a thresholding algorithm on the camera-captured image to determine if the camera captured image is of a type selected from at least:
      a first type containing positionally encoded maze patterns for a computationally efficient algorithm to decode the camera-captured image, and
      a second type containing document content that occludes at least a portion of the positionally encoded maze patterns, wherein the occlusion results in insufficient amount of maze patterns being visible for the computationally efficient algorithm to decode the camera-captured image;
   labeling the camera-captured image with the type based on the number of position encoding bits; and
   performing a search algorithm on the camera-captured image when an insufficient amount of maze patterns are visible.

6. The method of claim 5, wherein a support interval of gradient image histogram is used for determining whether the camera-captured image is of the first type or of the second type.

7. The method of claim 6, further comprising: applying a gradient operator to the camera-captured image to obtain a gradient image.

8. The method of claim 7, wherein the gradient operator is a Sobel edge operator.

9. The method of claim 8, further comprising: generating a histogram of the gradient image.

10. The method of claim 9, further comprising: using a largest number along the x-axis of the histogram that has a non-zero value as the support interval of gradient image histogram.

11. The method of claim 6, wherein an offline training session and an online labeling session are used for determining whether the camera-captured image is of the first type or of the second type.

12. The method of claim 11, wherein a threshold, for use in distinguishing between images of the first type and images of the second type, is selected based on results of the offline training session performed on training-data images.

13. The method of claim 12, wherein, during the online labeling session, the threshold is compared to a support interval of gradient image histogram of the camera-captured image to determine whether the camera-captured image is of the first type or of the second type.

14. A system, implemented at least in part by a computing device, that labels a document image containing positionally encoded maze patterns for computationally efficient decoding, the system comprising:
   an image-generation-and-capturing module including an image capturing pen that obtains the document image; and
   an analysis-and-labeling module that analyzes the document image to determine a number of position encoding bits that can be extracted from the document image, the analyzing including:
      dividing the document image into blocks having substantially the same size as maze pattern cells;
      determining whether the blocks are occluded by document content;
      counting, for each pixel in the document image, a number of completely visible blocks in a neighboring window with the pixel being as a center of the window; and
      labeling the pixel based on the number;
   wherein the analysis-and-labeling module further performs a thresholding algorithm and labels the document image as being of a type selected from at least:
      a first type containing sufficient amount of visible positionally encoded maze patterns for a computationally efficient algorithm to decode the document image, and
      a second type containing document content that occludes at least a portion of the positionally encoded maze patterns, wherein the occlusion results in insufficient amount of maze patterns being visible for the computationally efficient algorithm to decode the document image, wherein the analysis-and-labeling module further performs a search algorithm on the document image when an insufficient amount of maze patterns are visible.

15. The system of claim 14, wherein the image-generation-and-capturing module renders an electronic document to a bitmap representation corresponding to a printed document.

16. The system of claim 14, wherein the image-generation-and-capturing module processes a scanned paper document.

17. The system of claim 14, wherein the second type is divided into a plurality of subtypes that represent distinct degrees of occlusion of the positionally encoded maze patterns by the document content.

18. A system, implemented at least in part by a computing device, that labels a camera-captured image containing positionally encoded maze patterns for computationally efficient decoding, the system comprising:
an image-generation-and-capturing module including an image capturing pen that obtains the camera-captured image; and
an analysis-and-labeling module that that analyzes the camera-captured image to determine a number of position encoding bits that can be extracted from the camera-captured image, the analyzing including:
dividing the camera-captured image into blocks having substantially the same size as maze pattern cells;
determining whether the blocks are occluded by document content;
counting, for each pixel in the camera-captured image, a number of completely visible blocks in a neighboring window with the pixel being as a center of the window; and
labeling the pixel based on the number;
wherein the analysis-and-labeling module further performs a thresholding algorithm on the camera-captured image and labels the camera-captured image as being of a type selected from at least:
a first type containing sufficient amount of visible positionally encoded maze patterns for a computationally efficient algorithm to decode the camera-captured image, and
a second type containing document content that occludes at least a portion of the positionally encoded maze patterns, wherein the occlusion results in insufficient amount of maze patterns being visible for the computationally efficient algorithm to decode the camera-captured image,
wherein the analysis-and-labeling module further performs a search algorithm on the camera-captured image when an insufficient amount of maze patterns are visible.

19. The system of claim 18, wherein a support interval of gradient image histogram is used for determining whether the image is of the first type or of the second type.

20. The system of claim 19, wherein the analysis-and-labeling module applies a gradient operator to the camera-captured image to obtain a gradient image.

21. The system of claim 20, wherein the gradient operator is a Sobel edge operator.

22. The system of claim 19, wherein the analysis-and-labeling module generates a histogram of the gradient image.

23. The system of claim 22, wherein the analysis-and-labeling module uses a largest number along the x-axis of the histogram that has a non-zero value as the support interval of gradient image histogram.

24. The system of claim 23, wherein the analysis-and-labeling module performs an offline training session and an online labeling session to determine whether the camera-captured image is of the first type or of the second type.

25. The system of claim 24, wherein a threshold, for use in distinguishing between images of the first type and images of the second type, is selected based on results of the offline training session performed on training-data images.

26. The system of claim 25, wherein, during the online session, the analysis-and-labeling module compares the threshold to a support interval of gradient image histogram of the camera-captured image to determine whether the camera-captured image is of the first type or of the second type.

27. A computer-readable medium containing computer-readable instructions for labeling a document image containing positionally encoded maze patterns for computationally efficient decoding, by performing steps comprising:
obtaining the document image;
analyzing the document image to determine a number of position encoding bits that can be extracted from the document image, the analyzing including:
dividing the document image into blocks having substantially the same size as maze pattern cells;
determining whether the blocks are occluded by document content;
counting, for each pixel in the document imager a number of completely visible blocks in a neighboring window with the pixel being as a center of the window; and
labeling the pixel based on the number;
performing a thresholding algorithm on the document image to determine if the image is of a type selected from at least:
a first type containing sufficient amount of visible positionally encoded maze patterns for a computationally efficient algorithm to decode the document image, and
a second type containing document content that occludes at least a portion of the positionally encoded maze patterns, wherein the occlusion results in insufficient amount of maze patterns being visible for the computationally efficient algorithm to decode the document image;
labeling the document image with the type based on the number of position encoding bits; and
performing a search algorithm on the document image when an insufficient amount of maze patterns are visible.

28. The computer-readable medium of claim 27, wherein obtaining the document image further comprises: rendering an electronic document to a bitmap representation corresponding to a printed document.

29. The computer-readable medium of claim 27, wherein obtaining the document image further comprises: processing a scanned paper document.

30. The computer-readable medium of claim 27, wherein the second type is divided into a plurality of subtypes that represent distinct degrees of occlusion of the positionally encoded maze patterns by the document content.

31. A computer-readable medium containing computer-readable instructions for labeling a camera-captured image containing positionally encoded maze patterns for computationally efficient decoding, by performing steps comprising:
obtaining the camera-captured image;
analyzing the camera-captured image to determine a number of position encoding bits that can be extracted from the camera-captured image, the analyzing including:
dividing the camera-captured image into blocks having substantially the same size as maze pattern cells;

determining whether the blocks are occluded by document content;

counting, for each pixel in the camera-captured image, a number of completely visible blocks in a neighboring window with the pixel being as a center of the window; and labeling the pixel based on the number;

performing a thresholding algorithm on the camera-captured image to determine if the camera-captured image is of a type selected from at least:

a first type containing sufficient amount of visible positionally encoded maze patterns for a computationally efficient algorithm to decode the camera-captured image and a second type containing document content that occludes at least a portion of the positionally encoded maze patterns, wherein the occlusion results in insufficient amount of maze patterns being visible for the computationally efficient algorithm to decode the camera-captured image;

labeling the camera-captured image with the type based on the number of position encoding bits; and performing a search algorithm on the camera-captured image when an insufficient amount of maze patterns are visible.

32. The computer-readable medium of claim 31, wherein a support interval of gradient image histogram is used for determining whether the image is of the first type or of the second type.

33. The computer-readable medium of claim 32, containing further computer-executable instructions for performing steps comprising: applying a gradient operator to the image to obtain a gradient image.

34. The computer-readable medium of claim 33, wherein the gradient operator is a Sobel edge operator.

35. The computer-readable medium of claim 34, containing further computer-executable instructions for performing steps comprising: generating a histogram of the gradient image.

36. The computer-readable medium of claim 35, containing further computer-executable instructions for performing steps comprising: using a largest number along the x-axis of the histogram that has a non-zero value as the support interval of gradient image histogram.

37. The computer-readable medium of claim 32, wherein an offline training session and an online labeling session are used for determining whether the camera-captured image is of the first type or of the second type.

38. The computer-readable medium of claim 37, wherein a threshold, for use in distinguishing between images of the first type and images of the second type, is selected based on results of the offline training session performed on training-data images.

39. The computer-readable medium of claim 38, wherein, during the online labeling session, the threshold is compared to a support interval of gradient image histogram of the camera-captured image to determine whether the camera-captured image is of the first type or of the second type.

* * * * *